UNITED STATES PATENT OFFICE.

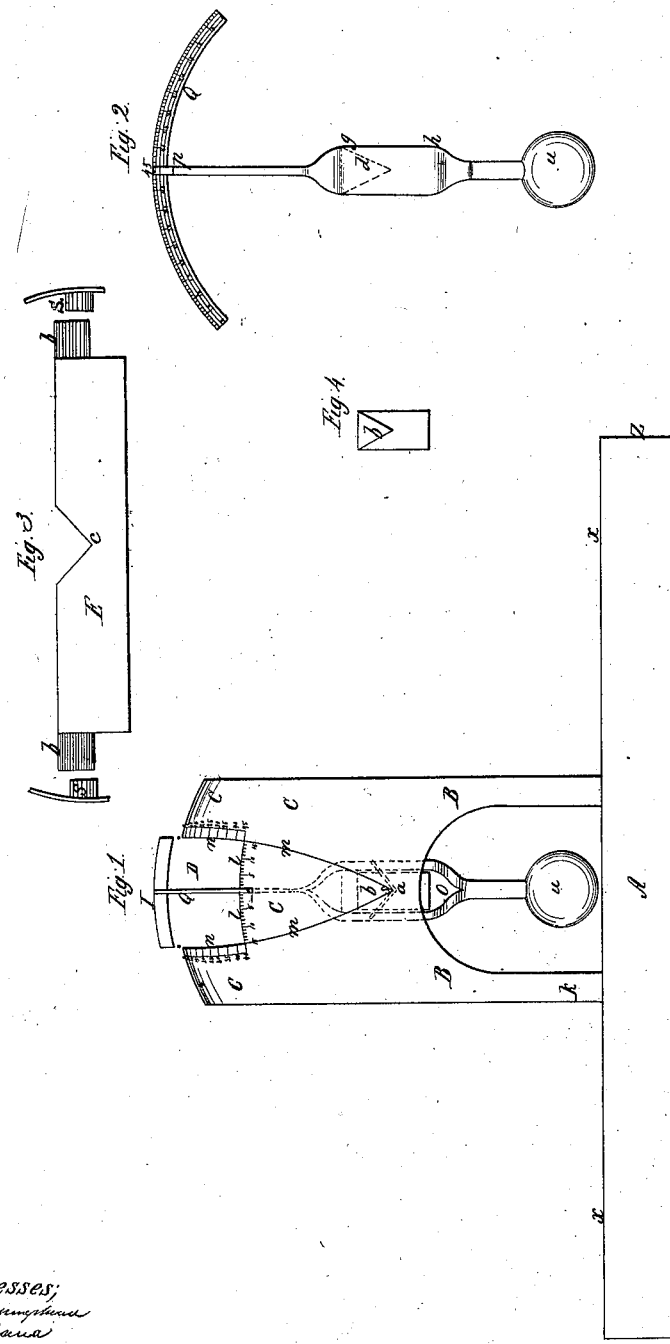

ELI THAYER, OF WORCESTER, MASSACHUSETTS.

IMPROVEMENT IN PLANE ANGULOMETERS.

Specification forming part of Letters Patent No. 36,312, dated August 26, 1862.

*To all whom it may concern:*

Be it known that I, ELI THAYER, of Worcester, in the county of Worcester and State of Massachusetts, have invented a new and improved instrument for ascertaining the level of plane surfaces or their angle of inclination to the horizon for nautical, astronomical, mechanical, and military uses; and I do hereby declare that the following is a full and exact description thereof, reference being had to the accompanying drawings, and to the letters of reference marked thereon.

Figure 1 represents a side elevation. Fig. 2 represents a side elevation of the pendulum and quadrant. Fig. 3 represents a side view of the axis of the pendulum and its bearings. Fig. 4 represents an end view of the axis.

The nature of my invention consists in so constructing and hanging a pendulum and so connecting it with a portion of the surface of a sphere that it will indicate at once whether any plane to which it is applied is level or horizontal, and if not level will show the degrees of the angle, whether of elevation or depression, which such plane makes with the horizon.

To enable others skilled in the art to make and use my invention, I will proceed to describe its construction and operation.

In the drawings, Fig. 1, A is the base of the instrument and may consist of wood or metal. It is of uniform thickness and its surfaces are plane. Its thickness should be such as to make it firm and strong. Upon this base there are erected four supports—two of which are seen in Fig. 1, marked B B. These supports have upon their tops a portion of a surface of a sphere, as seen in Fig. 1, marked C. In length this portion of the spherical surface should be not less than one hundred and eighty degrees. Its width should be not less than sixty degrees. In the center of this spherical surface is an opening bounded by the meridianal lines $m\ m$—ninety degrees on each—and by the longitudinal lines $l\ l$—thirty degrees on each. This space, inclosed as above described, is to allow the longitudinal and meridianal motions of the top of the pendulum bearing the graduated quadrant, as shown in Fig. 2 and marked P.

From zero on the meridianal lines $m\ m$ to $a$ the pole of the sphere is ninety degrees, and from zero on the same lines to the opposite pole is ninety degrees. The poles $a\ a$ are in the same straight line with the bearings $s\ s$ of the axis E, (shown in Fig. 3,) and are in the same plane with the transverse bearing C, in the middle of the axis, and of the knife-edge $d$, which is the center of the meridianal oscillation of the pendulum P, (shown in Fig. 2,) while the bearings $s\ s$ or their knife-edges $b\ b$ (shown in Fig. 3) are the extremities of the axis of its longitudinal oscillation.

The axis E should be made of metal, and its bearing and knife-edges should be of steel, as should also the bearings $s\ s$ and the knife-edge $d$.

Between the points $g$ and $h$ on the pendulum, as shown in Fig. 2, is an open space or mortise extending through the same, as shown at the letter $o$ of Fig. 1. The width and depth of this space is such as to allow the axis E to pass through the pendulum which vibrates thereon in meridianal lines. The center of this vibration is the bearing $c$ and the knife-edge $d$ of the pendulum, Fig. 2.

Q is a quadrant, graduated and attached to the top of the pendulum in the same plane with the poles $a\ a$. This quadrant measures the angles of elevation or depression of the plane on which the instrument is placed in the meridianal direction, or the direction of the axis by the degrees marked upon the quadrant. It also shows the angles of depression or elevation of the same plane in the longitudinal direction, or in the direction perpendicular to the axis by its position on the longitudinal line $l\ l$.

I is an index, (shown in Fig. 1,) which indicates angles of elevation or depression on the scales $n\ n$ of the meridianal lines $m\ m$, in the same way as the quadrant does by its own scale.

To show the operation of this instrument, (which may be called the "plane angulometer," since it measures the angles which planes make with the horizon,) suppose that the end L of the platform A, Fig. 1, is elevated, for example, ten degrees, the ball of the pendulum $u$, Fig. 1, would swing ten degrees toward a point half-way between $k$ and $k$, while the quadrant Q would move in the opposite direction and rest on the mark of ten degrees on the longitudinal line $l\ l$; or suppose the front side of the platform or base A to be elevated forty five degrees, while the back of the base remains level, the quadrant Q would move toward $a$ until its point or end would rest on the pole of the sphere, while the index I would move to and rest upon the line $l\ l$.

Although I have described but one method of constructing my plane angulometer, there are certain other methods of constructing parts of the same which may produce substantially the same result. For example, the pendulum may rest upon or move upon four bearings in the same plane, like the mariner's compass, instead of three bearings, as in the drawings. Possibly, also, a cylindrical surface might, for certain purposes, be substituted for the spherical, by making the index I movable on the pendulum, so as to allow the longitudinal motion, and by dispensing with the quadrant. In this case the longitudinal degrees would be marked upon the index, while the others would be marked, as in Fig. 1, upon the edges or periphery (in that case) of a cylinder. I do not therefore confine myself to the particular method of construction exhibited in the accompanying drawings, but intend to include all methods involving the same general plan and accomplishing the same results in my specifications.

Having thus described my invention and having shown its construction and operation, what I claim as my invention, and desire to secure by Letters Patent, is—

The pendulum moving upon three or more bearings in the same plane and carrying upon its top a graduated arc, and its combination with the spherical surface and the opening therein, substantially as set forth and described in the accompanying specifications and drawings, and for the purposes indicated.

ELI THAYER.

Witnesses:
JOHN S. HOLLINGSHEAD,
D. ROWLAND.